(12) United States Patent
   Hunt (10) Patent No.: US 10,845,275 B2
(45) Date of Patent: Nov. 24, 2020

(54) FINE TANK PRESSURE CONTROL USING THERMAL ENERGY FOR PREPARING CYTOLOGICAL SPECIMENS FROM PATIENT SAMPLES

(71) Applicant: HOLOGIC, INC., Marlborough, MA (US)

(72) Inventor: Barry F. Hunt, Andover, MA (US)

(73) Assignee: Hologic, Inc., Marlborough, MA (US)

(*) Notice: Subject to any disclaimer, the term of this patent is extended or adjusted under 35 U.S.C. 154(b) by 679 days.

(21) Appl. No.: 15/652,122

(22) Filed: Jul. 17, 2017

(65) Prior Publication Data

US 2019/0017906 A1  Jan. 17, 2019

(51) Int. Cl.
   *G01N 1/00* (2006.01)
   *G01N 1/28* (2006.01)
   (Continued)

(52) U.S. Cl.
   CPC .......... *G01N 1/2813* (2013.01); *B01L 3/5023* (2013.01); *B01L 7/00* (2013.01); *G01N 35/1009* (2013.01); *G01N 35/1016* (2013.01); *B01L 2200/0647* (2013.01); *B01L 2200/146* (2013.01); *B01L 2300/14* (2013.01); *B01L 2300/1822* (2013.01); *B01L 2400/049* (2013.01); *B01L 2400/0487* (2013.01);
   (Continued)

(58) Field of Classification Search
   None
   See application file for complete search history.

(56) References Cited

U.S. PATENT DOCUMENTS

| 5,143,627 A | 9/1992 | Lapidus et al. |
| 5,240,606 A | 8/1993 | Lapidus et al. |

(Continued)

FOREIGN PATENT DOCUMENTS

| EP | 0448837 | 10/1991 |
| WO | 2011/041703 | 4/2011 |

OTHER PUBLICATIONS

PCT International Search Report and Written Opinion for International Appln. No. PCT/US2018/035382, Applicant Hologic, Inc., Forms PCT/ISA/210, 220, and 237, dated Aug. 21, 2018 (13 pages).

*Primary Examiner* — Jyoti Nagpaul
(74) *Attorney, Agent, or Firm* — Vista IP Law Group, LLP (57) ABSTRACT

Systems and methods for preparing a cytological specimen from a patient sample in a sample container include or employ mechanisms for quickly and accurately adjusting the pressure in a pressure unit during the specimen preparation. The systems include a specimen transfer device configured for being positioned within the sample container, a pressure tank coupled to the specimen transfer device and configured for applying at least one of positive pressure and vacuum pressure through the specimen transfer device, and a temperature adjusting unit coupled to the pressure tank, and configured for incrementally adjusting the pressure in the pressure tank by heating or cooling the tank. The method includes steps of performing a coarse pressure adjustment using a supply valve and/or a bleed valve coupled to the pressure tank, and, after the coarse adjustment, performing a fine pressure adjustment using a temperature adjusting element coupled to the pressure tank.

15 Claims, 8 Drawing Sheets

(51) Int. Cl.
*B01L 7/00* (2006.01)
*B01L 3/00* (2006.01)
*G01N 35/10* (2006.01)
*G01N 1/40* (2006.01)

(52) U.S. Cl.
CPC ... *G01N 1/4005* (2013.01); *G01N 2001/2826* (2013.01); *G01N 2001/4088* (2013.01); *G01N 2035/1034* (2013.01); *G01N 2035/1053* (2013.01)

(56) References Cited

U.S. PATENT DOCUMENTS

| | | |
|---|---|---|
| 5,269,918 A | 12/1993 | Lapidus et al. |
| 5,282,978 A | 2/1994 | Polk, Jr. et al. |
| 7,055,723 B2 | 6/2006 | Ingenhoven et al. |
| 2007/0151984 A1* | 7/2007 | Baker .................. A61J 1/2089 222/129 |
| 2014/0162347 A1 | 6/2014 | Alspektor |

* cited by examiner

FINE TANK PRESSURE CONTROL USING THERMAL ENERGY FOR PREPARING CYTOLOGICAL SPECIMENS FROM PATIENT SAMPLES

FIELD OF INVENTION

The present invention generally relates to preparation of cytological specimens from patient samples, and more particularly, to systems and methods for preparing a cytological specimen by collecting a patient sample from a sample container and dispensing the patient sample onto an analytical element, such as a glass slide, including mechanisms and their use for quickly and accurately adjusting a gas pressure in a pressure unit during the specimen preparation.

BACKGROUND

Cytology is a branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A well-known cytological technique is a "pap smear" test, in which cells are scraped from a woman's cervix (an example of a "patient sample" as used herein) and analyzed in order to detect the presence of abnormal cells which may be a precursor to the onset of cervical cancer. Cytological techniques are also used to detect abnormal cells and disease in other parts of the human body.

Cytological techniques are widely employed because collection of cell samples (or "patient samples") for analysis is generally less invasive than traditional surgical pathological procedures such as biopsies, whereby a tissue specimen is excised from the patient using specialized biopsy needles having spring loaded translatable stylets, fixed cannulae, and the like. Instead, cell samples may be obtained from the patient by a variety of techniques including, for example, by scraping or swabbing an area, or by using a needle to aspirate body fluids from the chest cavity, bladder, spinal canal, or other appropriate area. The patient samples are placed in solution and subsequently collected and transferred to a glass slide for viewing under magnification. Fixative and staining solutions may be applied to the cells on the glass slide for preserving the specimen for archival purposes and for facilitating examination.

It is generally desirable that the cells on the slide have an adequate spatial distribution so that individual cells can be examined without overlapping cells. In particular, a single layer of cells is preferred. Accordingly, preparing a specimen from a fluid sample containing many cells requires that the cells first be separated from each other by mechanical dispersion, fluidic shear, or other techniques, so that a thin, monolayer of cells can be collected and deposited on the slide. In this manner, the cells are also able to be counted to ensure that an adequate number of cells have been evaluated.

Certain methods and apparatus for generating a thin monolayer of cells on a slide advantageous for visual examination are disclosed in U.S. Pat. No. 5,143,627 issued to Lapidus et al. and entitled "Method and Apparatus for Preparing Cells for Examination;" U.S. Pat. No. 5,240,606 issued to Lapidus et al. and entitled "Apparatus for Preparing Cells for Examination;" U.S. Pat. No. 5,269,918 issued to Lapidus et al. and entitled "Clinical Cartridge Apparatus;" and U.S. Pat. No. 5,282,978 issued to Polk, Jr. et al. and entitled "Specimen Processor Method and Apparatus," all of which are assigned to the assignee of the present invention and all of the disclosures of which are incorporated herein by reference in their entirety.

According to one method disclosed in these patents, a patient's cells in a preservative fluid in a sample container are dispersed using a spinning sample collector disposed therein. A controlled vacuum is applied to the sample collector to draw the fluid through a screen filter thereof until a desired quantity and spatial distribution of cells is collected against the filter. Thereafter, the sample collector is removed from the sample container and the filter portion impressed against a glass slide while positive pressure is applied to transfer the collected cells to the slide in substantially the same spatial distribution as collected.

While apparatus manufactured according to the teachings of one or more of these patents have been commercially successful, such as the ThinPrep® 2000 System manufactured and sold by Hologic, Inc., located at 250 Campus Drive, Marlborough, Mass. (www.hologic.com), such apparatus requires tightly controlled vacuum and positive pressures of relatively small magnitudes. Typically a tank is used to provide a pressure reservoir, as the volume of the tank provides a steady pressure source. Consequently, that tank must be charged to the desired pressure prior to applying that pressure to the filter. The pressure of the tank is conventionally controlled using a pump, a bleed valve, a pressure sensor and a controller. The controller reads the pressure sensor and either runs the pump to increase the pressure in the tank, or opens the bleed valve to decrease the pressure. Depending on the pressure range desired, this operation can take many seconds to stabilize.

In particular, the ability to achieve the desired pressure range is directly related to the flow rate and actuation time of the bleed valve and the flow rate and turn-on/off time of the pump. Getting the tank to pressure can be especially problematic when the required pressure range is very small (one pressure may be −0.1 psi+/−0.01 psi, a second pressure may be +0.005 psi+/−0.001 psi). Since many different pressures are used in the process, the pressure in the tank(s) must be changed frequently, and sometimes it must be changed substantially. The time it takes to change the pressure directly impacts the throughput of the sample processor. For example, in a busy lab, the above-described specimen preparing system processes about twenty five patient samples per hour. Thus, decreasing the sample processing time by as little as ten seconds per sample by stabilizing the pressure tanks faster would allow the system to process an extra two samples per hour, or about fifteen additional samples per eight hour shift.

SUMMARY OF DISCLOSED INVENTIONS

In one embodiment of the disclosed inventions, a system for preparing a cytological specimen from a patient sample in a sample container includes a specimen transfer device configured for holding a sample collector thereon and for being positioned within the sample container, a pressure tank coupled to the specimen transfer device and configured for applying at least one of positive pressure and vacuum pressure through the specimen transfer device, and a temperature adjusting unit thermally coupled to the pressure tank, wherein the temperature adjusting unit is configured for incrementally adjusting a pressure in the pressure tank by heating or cooling a wall of the tank. The pressure tank may be a vacuum tank or a positive pressure tank. By way of non-limiting examples, the temperature adjusting unit may be a heater or a Peltier device. The system may further include one or more of a bleed valve, a pump, and a supply valve coupled to the tank. A controller (which may be a same or different controller than a controller that operates the specimen transfer device) is preferably operatively coupled to the temperature adjusting unit for controlling operation of same.

In accordance with another embodiment of the disclosed inventions, a method for preparing a cytological specimen from a patient sample in a sample container includes the steps or acts of (i) positioning a membrane on a distal end of a sample collector within the sample container; (ii) adjusting a pressure within a pressure tank coupled to the sample collector until the pressure is within a desired pressure range, wherein adjusting the pressure comprises (a) performing a coarse pressure adjustment using at least one of a supply valve and a bleed valve coupled to the tank; and (b) thereafter performing a fine pressure adjustment using a temperature adjusting element that is thermally coupled to the pressure tank; and (iii) collecting a sample on the sample collector membrane by communicating the pressure tank pressure through the sample collector.

In exemplary embodiments of the method, the temperature adjusting element may be a heater, and the method may include performing the coarse pressure adjustment until the tank pressure is within a predetermined range below the desired pressure range and performing the fine pressure adjustment by incrementally increasing the tank pressure by applying heat to the outside of the tank until the tank pressure is within the desired pressure range.

In exemplary embodiments of the method, the coarse pressure adjustment may be performed until the tank pressure is within a predetermined range of the desired pressure range, and incrementally increasing or decreasing the tank pressure by heating or cooling the outside surface of the tank until the tank pressure is within the desired pressure range. Alternatively, the coarse pressure adjustment may be performed until the tank pressure is within a predetermined range above the desired pressure range, and thereafter the fine pressure adjustment may include incrementally decreasing the tank pressure by cooling the outside surface of the tank until the tank pressure is within the desired pressure range. Performing the coarse pressure adjustment may include using the bleed valve to lower the pressure, and performing the fine pressure adjustment may include applying heat to the pressure tank to increase the pressure within the tank until the desired pressure range is achieved.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION

Disclosed herein are a system and method for incrementally adjusting tank pressure in order to quickly and accurately bring a pressure tank to a desired pressure for cytological specimen (e.g., slide) preparation. The pump/bleed method discussed above may still be used to make coarse changes to the pressure of the tank. However, in accordance with the disclosed inventions, by applying or removing heat, the tank pressure can be quickly increased or decreased in relatively precise increments. This thermal control mechanism could theoretically be the only source of adjusting the tank pressure, but as a practical matter is used for very fine control of the pressure once the pump/bleed got the tank close to a desired pressure.

Figure 1:
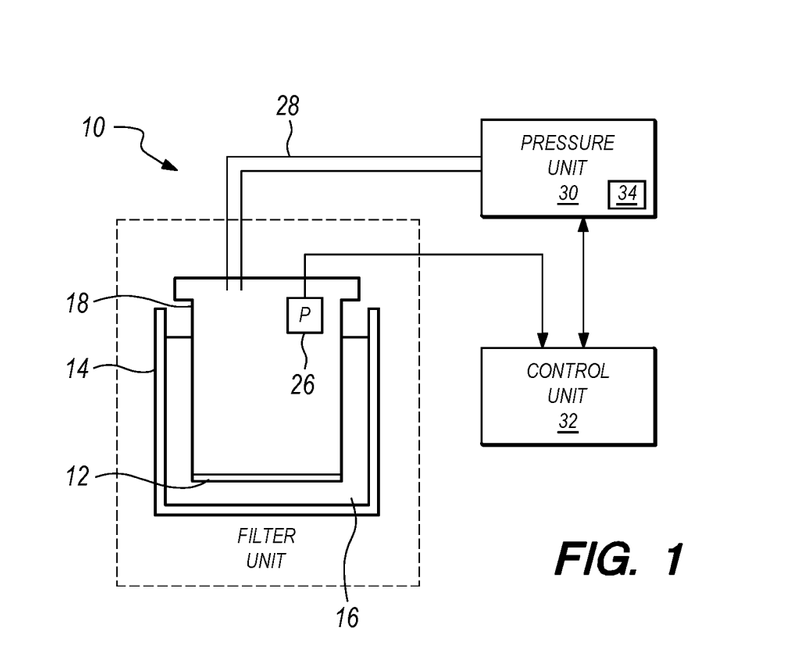
FIG. 1 is a schematic block diagram of a specimen collection system, according to one embodiment of the present invention.
Figure 2:
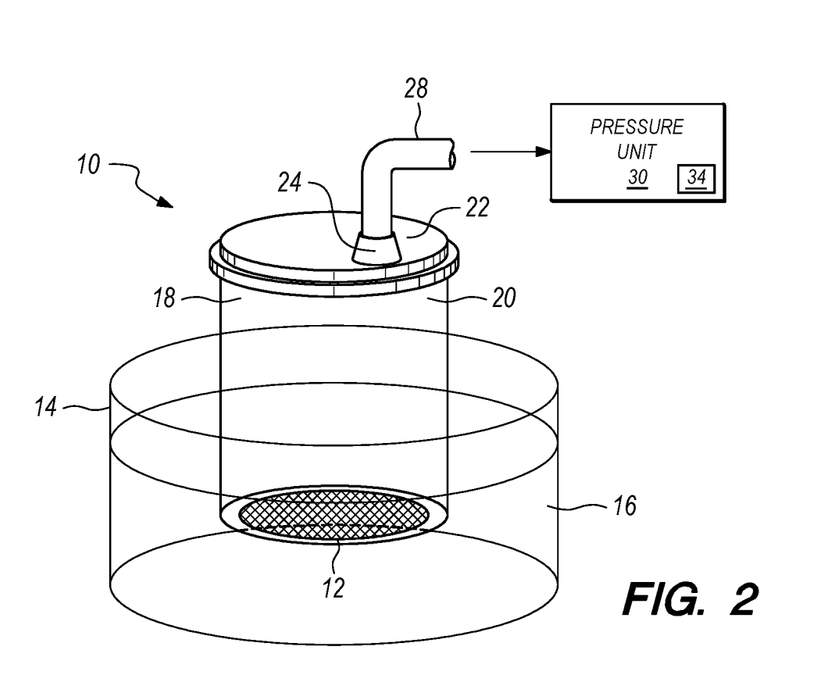
FIG. 2 shows a liquid container and filter vessel for use in the apparatus of FIG. 1.

FIGS. 1-2 show a system 10 according to one practice of the invention for controlled instrumented processing of biological cells. The illustrated system collects a selected quantity of cells onto a screen-type filter 12. The system 10 has a specimen container 14 that contains a liquid 16 that carries the cells. The filter 12 is on the bottom wall of a collection vessel 18. The collection vessel 18 is fitted within the specimen container 14 to immerse the filter 12 into the liquid 16 in the container 14.

The illustrated specimen container 14 is open at the top to the atmosphere and can be an open vessel such as a cup, vial, or beaker. The illustrated collection vessel 18 has a cylindrical tubular body 20 with the filter 12 spanning and closing a normally lower axial end. The body 20 of the collection vessel 18 is fitted with a cap 22 at the other, normally upper end. The screen-type filter 12 is preferably a membrane filter and hence is provided with a uniform distribution of pores of substantially uniform size to block cells and other particles above a threshold size determined by the size of the pores, and to freely pass smaller particles. The filter has a filtering surface, illustrated as an essentially flat disc that has a surface area of known or readily determined size.

The cap 22 that closes the top of the vessel 18, together with the body 20, renders the vessel 18 pressure tight except at the filter 12 and at a port 24 in the cap 22. As shown in FIG. 1, the illustrated cap 22 also mounts a pressure transducer 26 arranged for sensing the pressure within the collection vessel 18, preferably at its normally upper end. A pressure hose 28 connects the port 24 of the collection vessel 18 to a pressure unit 30, so that the pressure unit 30 is in fluid communication with the interior of the collection vessel 18. The pressure unit 30 includes a temperature adjusting unit 34. An electronic control unit 32 connects with the pressure transducer 26 to receive a pressure-responsive electrical signal, and connects with the pressure unit 30.

The pressure unit 30, typically in response to electrical control signals from the control unit 32, which can be microprocessor controlled, applies selected fluid conditions to the interior of the collection vessel 18. More particularly, the control unit 32 and pressure unit 30 operate the illustrated system 10 to collect a selected quantity of cells onto the underside of the filter 12, from a sample carried in the liquid 16 and wherein the cells have a known average size above the filter pore size, i.e. above a selected threshold size, and otherwise are of unknown quantity.

For this operation, the pressure unit 30, typically in response to signals from the control unit 32, applies a flow condition to the interior of the collection vessel 18 to create a selected flow of liquid from the specimen container 14 to the collection vessel 18, by way of the filter 12. The pressure unit 30 may be configured to cycle a vacuum (and pressure) within the collection vessel 18 in order to force the sample back and forth through the membrane 12. This flow of liquid carries cells to the filter 12, which accordingly becomes progressively covered and hence blocked by the cells. The pressure unit 30 applies the selected flow condition to the collection vessel until the filter 12 becomes clogged by a selected amount, as determined at least in part by the pressure sensed within the vessel 18 by means of the transducer 26.

The pressure unit 30 includes one or more pressure tanks and a temperature adjusting apparatus 34 coupled to the outside of each of the tanks. As discussed above, the pressure in the tanks is typically controlled using a pump, a bleed valve, a pressure sensor and the controller 32. The temperature adjusting apparatus 34 of the illustrated invention allows for fine adjustments in the pressure by either heating or cooling the tanks, thereby incrementally increasing or decreasing, respectively, the pressure in the tanks. The pressure adjustment using the supply and bleed valve may be considered a "coarse" pressure adjustment, while the pressure adjustment using the temperature adjusting apparatus 34 may be considered a "fine" pressure adjustment. The rate at which the pressure changes using the temperature adjusting apparatus 34 depends on the thermal energy transfer capability of the temperature adjusting apparatus 34.

Notably, providing the temperature adjusting apparatus 34 to perform allows the conventional coarse pressure adjustment mechanisms (supply and bleed valves) to operate faster, since they need not be particularly accurate. In particular, the speed of the pump, the actuation time and flow rate of the valves, and (of course) the volume of the tank all determine how fast the pressure can be adjusted using the conventional coarse pressure adjustment mechanisms. By providing the temperature adjust apparatus 34, these coarse mechanical mechanisms may be more quickly performed to operate more quickly to get the pressure roughly correct.

Figure 3:
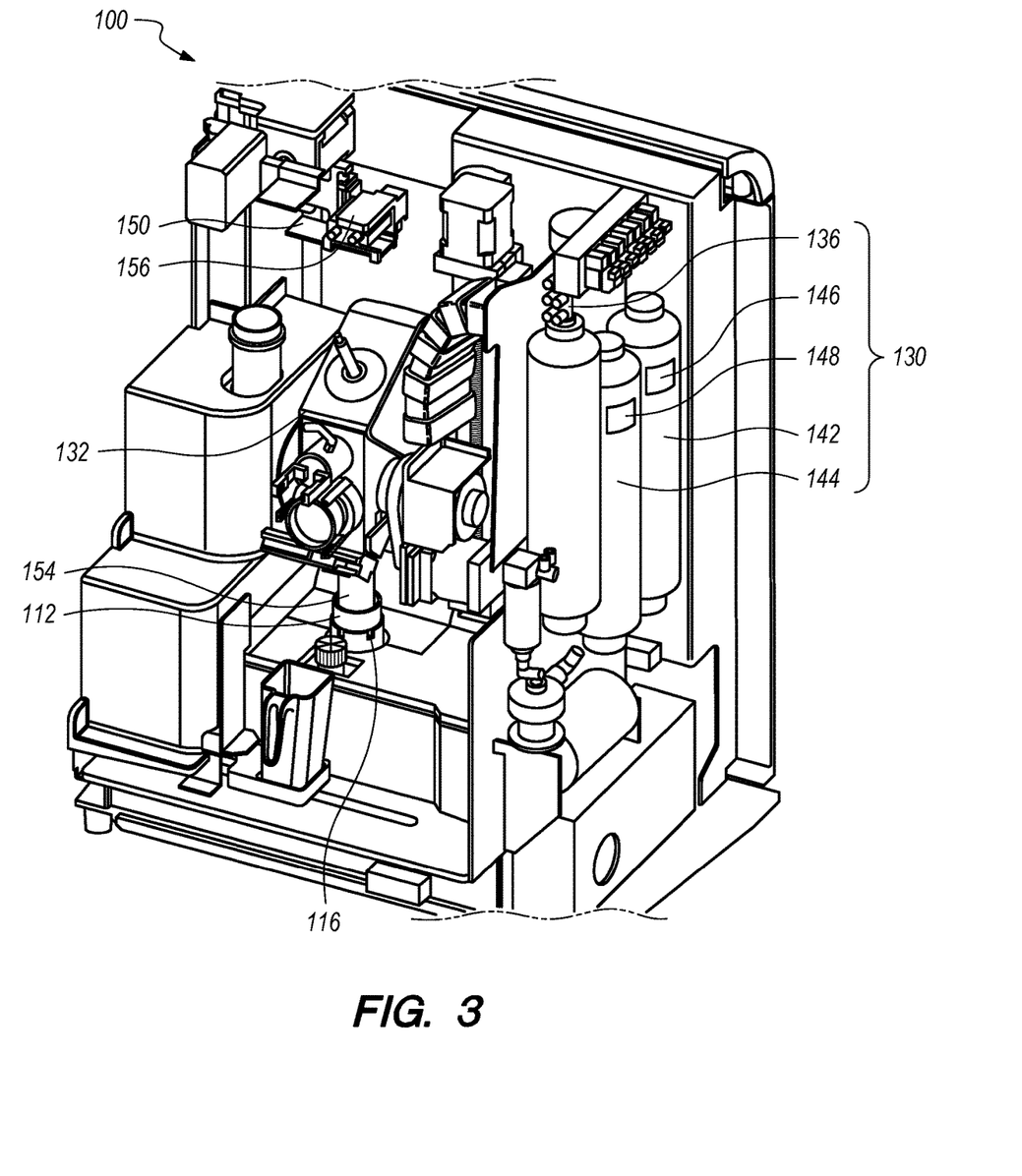
FIGS. 3-5 are right, front, perspective views of a specimen preparation system with a tool head in different positions.
Figure 4:
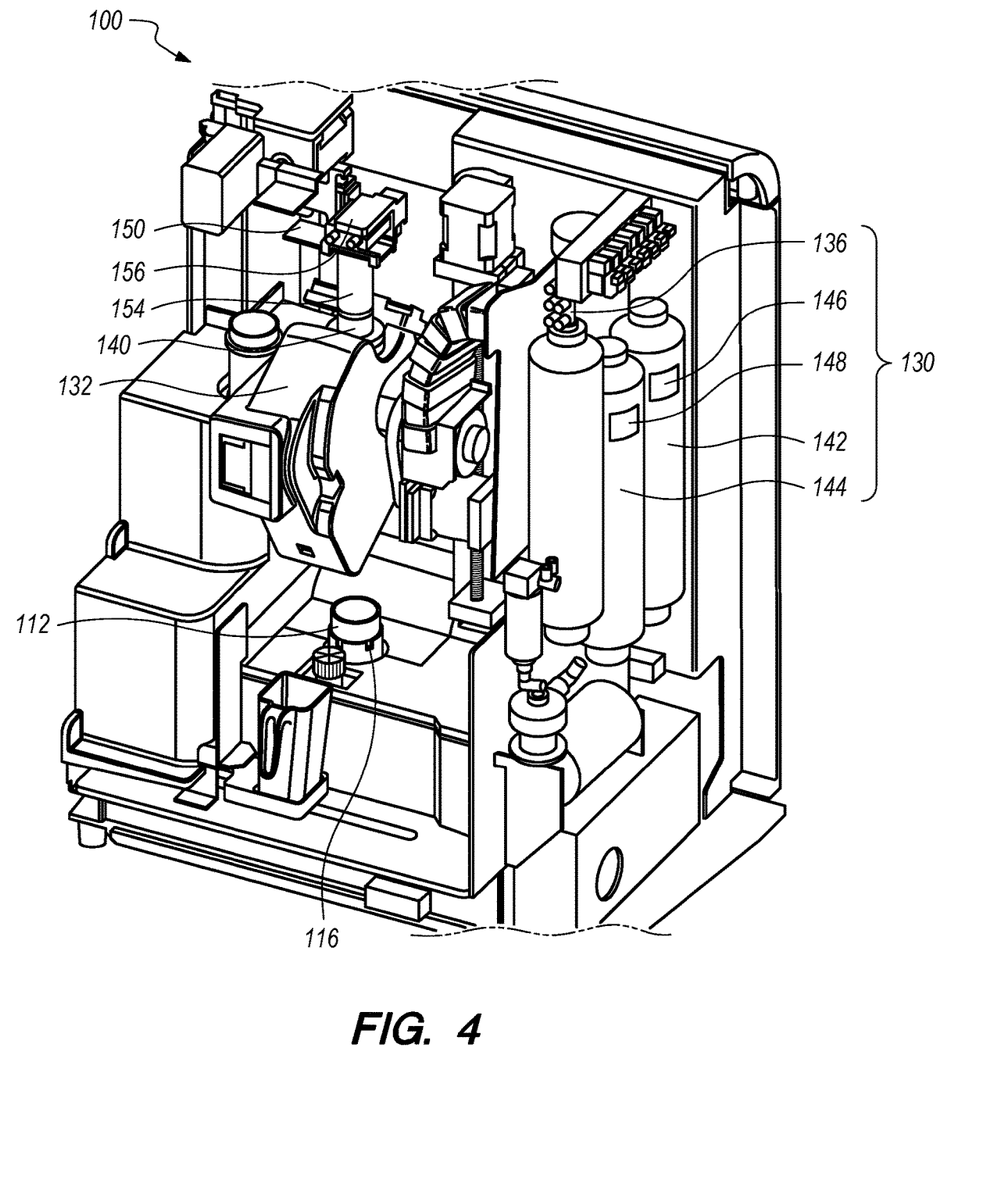
Figure 5:
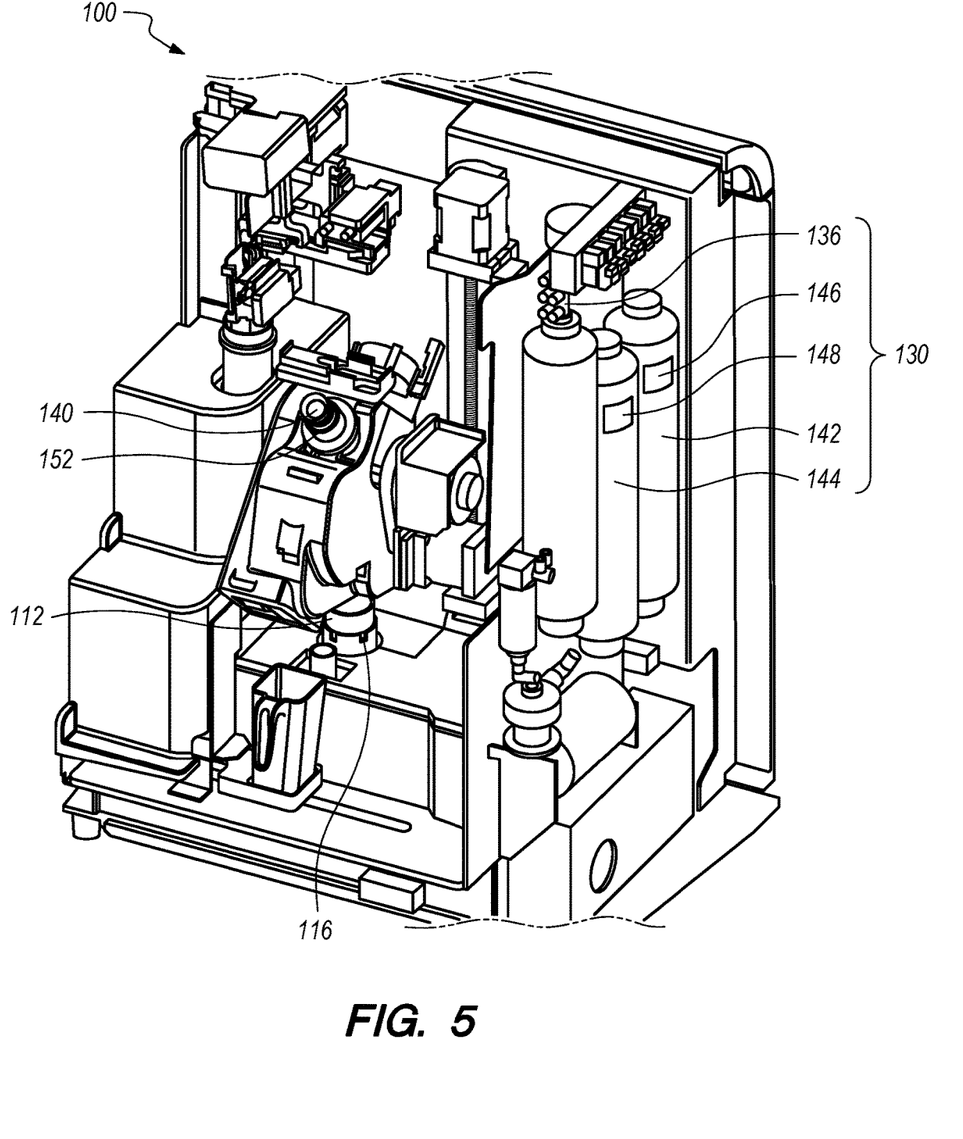

FIGS. 3-5 show a system 100 according to another embodiment of the present invention. Similar to the system 10 described above, the system 100 includes a collection vessel 154 (shown in FIGS. 3 and 4) having a membrane on a distal end thereof, a pressure unit 130 coupled to the collection vessel 154, and a sample container 112 from which the specimen is collected. Other features of the system 100 are described in greater detail in U.S. patent application Ser. No. 15/454,819, the contents of which are hereby fully incorporated herein by reference. The collection vessel 154 is disposed on a cylindrical member 152 (shown in FIG. 5) of a specimen transfer device 140. The specimen transfer device 140 is coupled to a rotating tool head 132 and to the pressure unit 130. After the sample is collected on the membrane of the collection vessel 154, the rotating tool head 132 may be rotated to place the collection vessel 154 in contact with an analytical element (or microscope slide) 150, as depicted in FIG. 4.

In this embodiment, the pressure unit 130 includes a positive pressure tank 142, a vacuum pressure tank 144, and temperature adjusting elements 146 and 148 coupled to the outside of the tanks 142 and 144. The tanks 142 and 144 are coupled to the specimen transfer device 140 through a manifold 136. In an alternate embodiment, a single temperature adjusting element 146 or 148 may be sandwiched between the two tanks (i.e., in thermal contact with both tanks) to reduce system cost.

As shown in FIG. 3, during sample collection, the sample collector 154 is positioned in the sample container 112, similar to the arrangement depicted in FIGS. 1 and 2. The pressure unit 130 may be configured to cycle a vacuum and pressure within the sample collector 154 in order to force the sample back and forth through the membrane on the distal end of the sample collector 154 Alternatively, the pressure unit 130 may be operated to apply vacuum only through the sample collector 154 during sample collection. The pressure unit 130 may be operated to apply positive pressure through the sample collector 154 during transfer of the sample from the sample collector 154 to the analytical element 150, which is depicted in FIG. 4. Vacuum or positive pressures are applied through the sample collector 154 by first adjusting the pressures in the tanks 142, 144, until a tank pressure that is within the desired pressure range is reached, and then applying the vacuum or positive pressure through the sample collector 154. The pressures in the tanks 142, 144 may initially be adjusted by bleeding and/or pressurizing the tanks 142, 144 until the pressure is close to the desired pressure range. This is a relatively quick, coarse pressure adjustment.

For example, the pressure in the tank 142 and/or 144 may be increased or decreased using the supply or bleed valve until the pressure in the tank is within a predetermined range of the desired pressure range. In one embodiment, the desired pressure range may be −0.11 to −0.09 psi, and the supply and bleed valve may be operated until the tank pressure is within 0.05 psi of the desired range. Thus, the supply and/or bleed valve may be operated until the tank pressure is between −0.16 and −0.04 psi. Then, the pressure may be incrementally adjusted by using the temperature adjusting element 146, 148 to heat or cool the tank 142, 144 until a tank pressure within the desired pressure range is achieved. Once a pressure within the desired pressure range is achieved, that pressure is applied to the sample collector 154 in order to collect cells on the membrane as discussed above.

After the sample is collected from the sample container 112 onto the sample collector 154, the sample is transferred to an analytical element (e.g., a microscope slide) 150. As shown in FIG. 4, the sample collector 154 is placed in contact with an analytical element 150 so that the sample collected on the membrane of the sample collector 154 may be transferred to the analytical element 150. While the sample collector 154 is in contact with the analytical element 150, a positive pressure may be applied through the sample collector 154 to facilitate transfer of the sample cells from the membrane onto to analytical element 150. In order to apply the positive pressure through the sample collector 154, the positive pressure tank 142 must first be pressurized to the desired pressure. As such, a coarse pressure adjustment may initially be performed by using supply and/or bleed valves to get the tank pressure within a predetermined ranged of the desired pressure range (e.g., within 0.002 psi of the desired pressure range).

For example, the desired pressure range may be +0.004 to +0.006 psi and the supply and/or bleed valve may be operated until the tank pressure is between +0.002 and +0.008 psi. The pressure may then be incrementally adjusted by using the temperature adjusting element 146 to increase or decrease the pressure until a pressure within the desired pressure range is achieved. With the tank 142 at the desired pressure, the positive pressure is applied through the sample collector 154 in order to transfer the sample onto the analytical element 150.

It should be appreciated that the disclosed embodiments including the fine pressure adjustment mechanism, allows for maintaining the system pressure within a very narrow (or "tight") range for an extended period of time, assuming the pressure is not being rapidly dissipated. Maintaining such a narrow or tight pressure range is very difficult if not impossible to do using only the conventional coarse pressure adjustment mechanisms.

Figure 6:
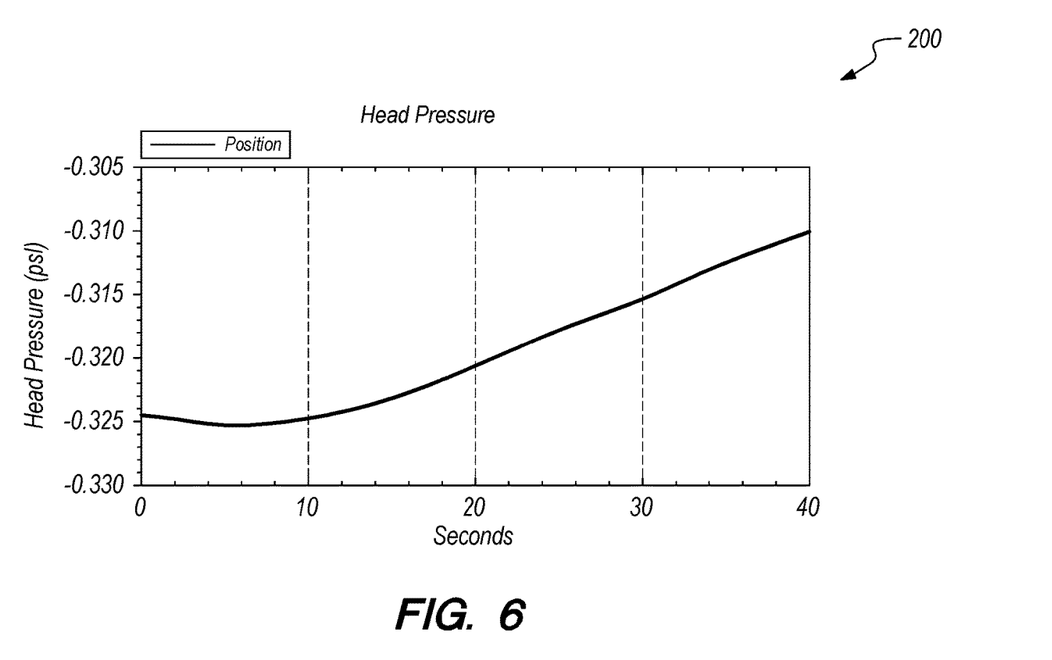
FIG. 6 is a graph depicting pressure adjustment in a tank using thermal control.

The graph 200 depicted in FIG. 6 demonstrates the thermal pressure control. A 250 mL tank was brought to a vacuum pressure. A heat source having a temperature about 25 degrees above ambient and a surface area of roughly 8 square inches was applied to one side of the tank while the pressure was monitored. It can be seen from the graph that the pressure increased at the rate of approximately 0.0004 psi per second (from −0.325 to −0.310 in 40 seconds). The graph shows that the temperature rise is very linear in nature, which means that adjusting the pressure a known amount may be easily accomplished in a predictable manner. The pressure may be raised more quickly using higher heat or a larger surface area of the heat source. Likewise, even finer control may be achieved by reducing the heat or surface area so that the raise in pressure happens more gradually.

There are several ways to implement this thermal pressure control. Different embodiments of the pressure unit will now be discussed with reference to FIGS. 7-9. It should be understood that these different embodiments may be incorporated into the pressure units 30 and 130 discussed above with reference to FIGS. 1-5.

Figure 7:
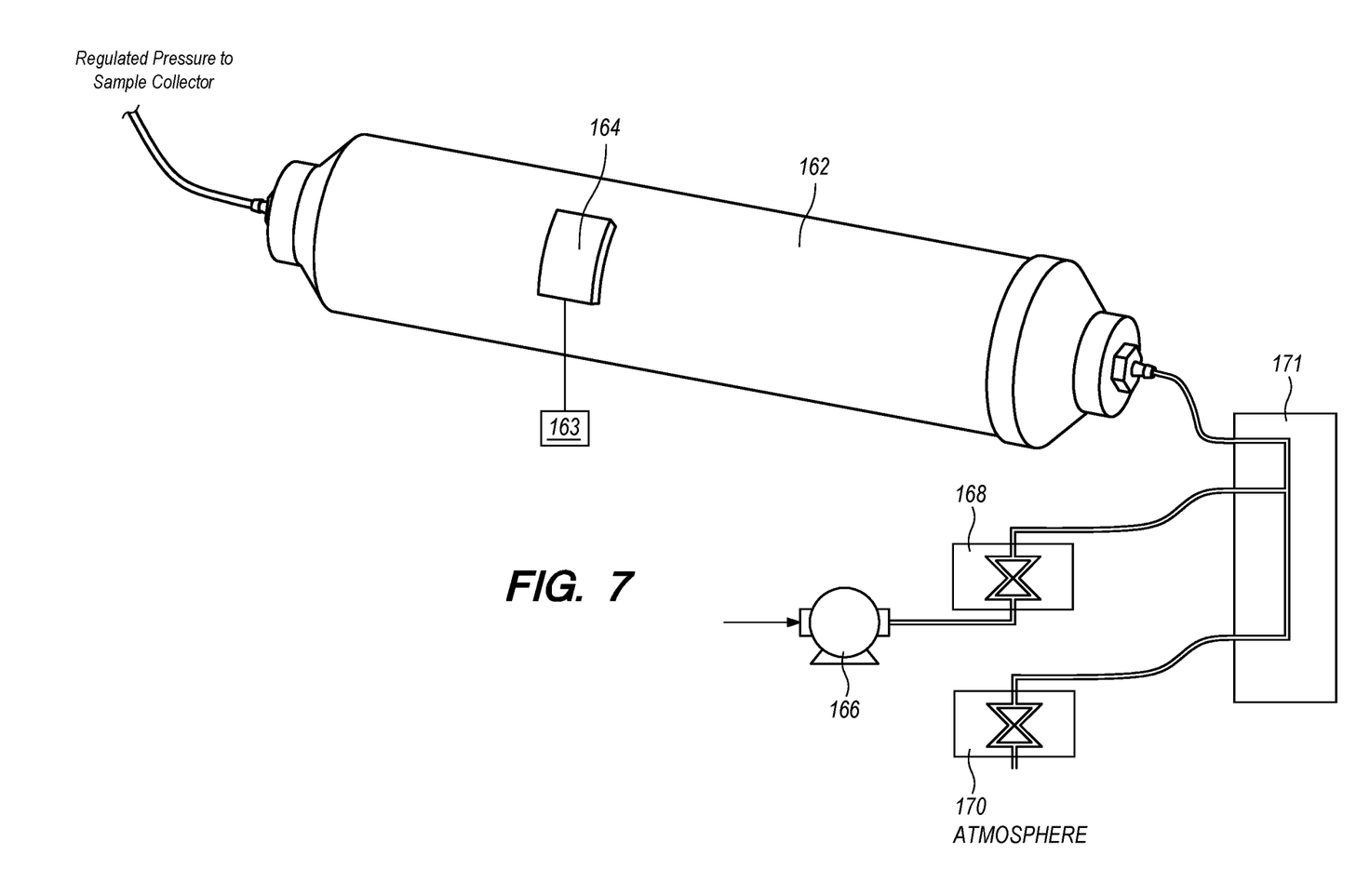
FIGS. 7-9 are perspective views of different configurations of pressure tanks and temperature adjustment units according to different embodiments of the present invention.

In one embodiment, the thermal pressure control uses only heat, wherein the tank, or part of the tank, is in contact with a heating element that is only capable of increasing the temperature, and thus the pressure, of the tank. For example, as shown in FIG. 7, a heating element 164 is coupled to the outside of a pressure tank 162. The tank 162 may be a vacuum tank or a positive pressure tank. The heating element 164 may be a heating blanket, a heating pad, or the like. The heater 164 is coupled to a controller 163 for controlling the temperature of the heater 164. In this embodiment, the pressure could only be adjusted upwards using the heating element 164 since pressure increases as temperature increases. A pump 166 and a supply valve 168 may be operated to increase the pressure in the tank 162. A bleed valve 170 may be operated to decrease the tank pressure. The valves 168 and 170 are coupled to the tank 162 through a manifold 171. Operation of the valves 168 and 170 provides coarse pressure adjustment to get the tank 162 to a pressure that is close to, but below, the desired pressure range. The heating element 164 may then be operated to increase the tank pressure, in a slow and controlled manner, to a pressure that is within the desired range.

Figure 8:
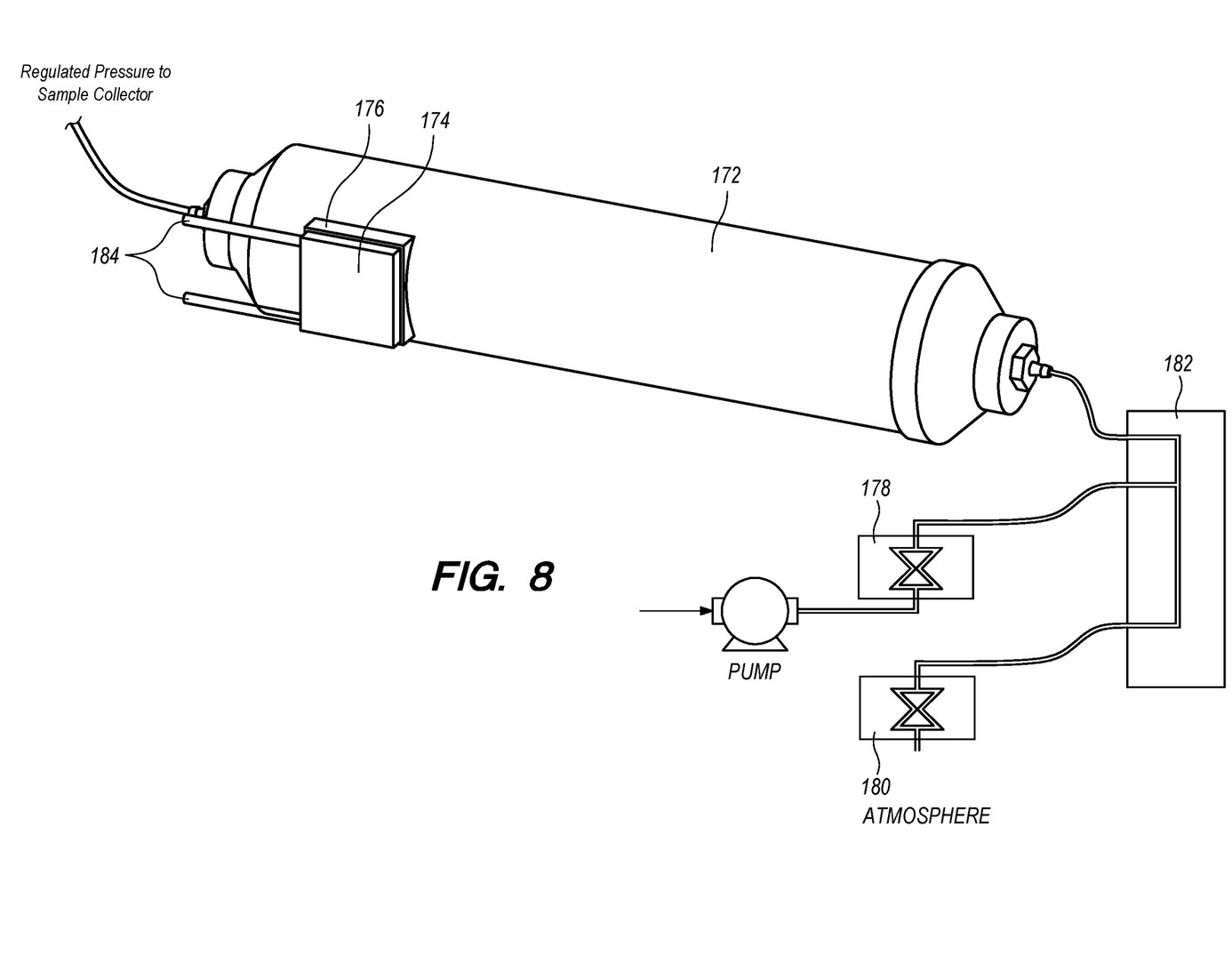

In another embodiment, a device which can add or remove heat (such as a Peltier heat pump) may be used. In this embodiment, the tank pressure can be finely adjusted up or down by adding or removing heat. As shown in FIG. 8, a Peltier heat pump 174 is coupled to the outside surface of a pressure tank 172. The pressure tank 172 may be a vacuum tank or a positive pressure tank. The Peltier device 174 is coupled to a conductor 176, which is mounted to the outside of the tank 172. The tank 172 is coupled to a supply valve 178 and bleed valve 180 through a manifold 182 at one end of the tank 172. The other end of the tank 172 is coupled to a sample collector (such as the sample collectors 18 or 154 shown in FIGS. 1-5). The Peltier heat pump 174 is coupled to a controller 184 for controlling the temperature of the Peltier heat pump 174, and thus the pressure in the tank 172. The Peltier heat pump 174 may be controlled to either heat or cool the tank 172.

Figure 9:
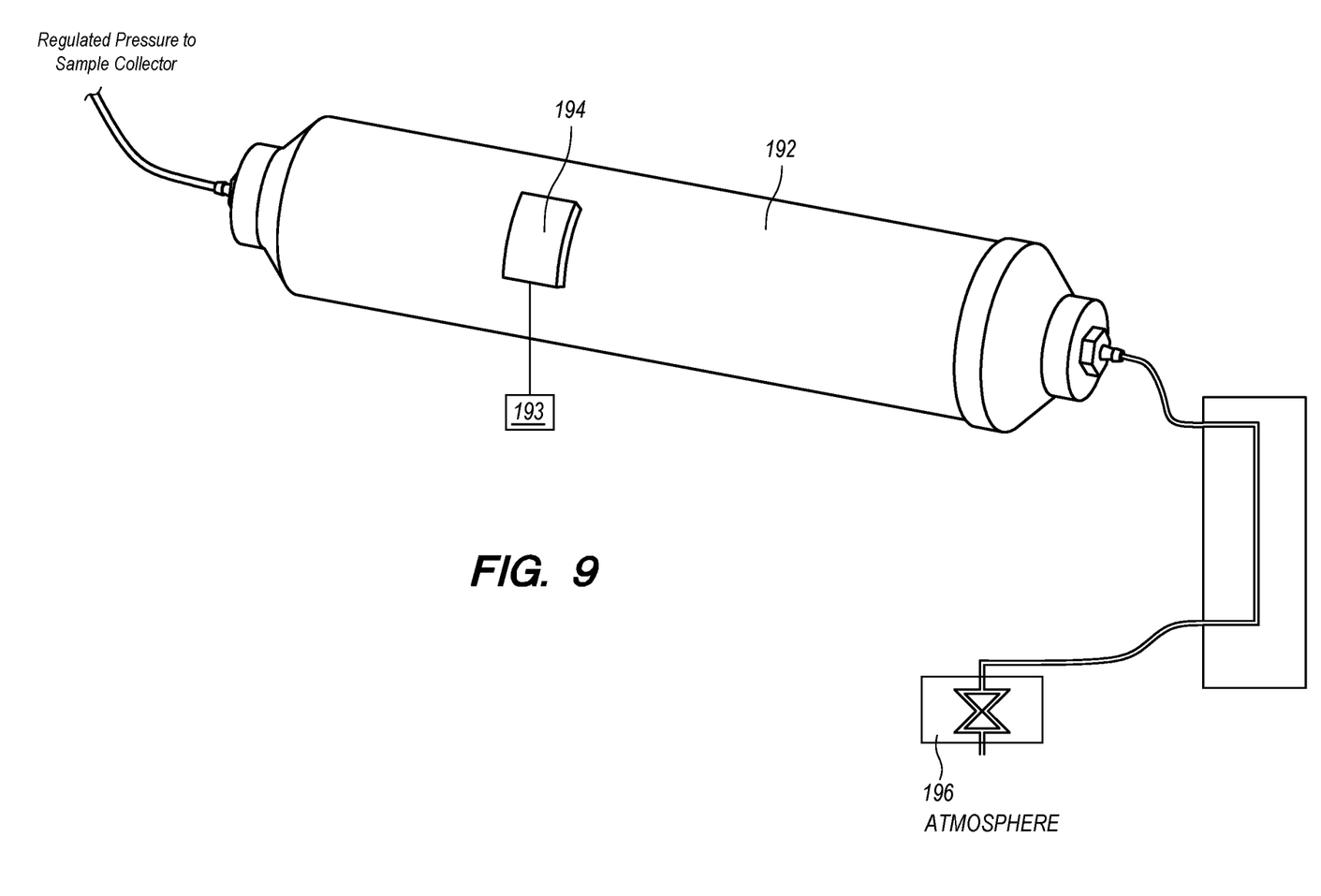

In yet another embodiment, shown in FIG. 9, the pressure unit includes a tank 192, a heater 194, and bleed valve 196, but does not include a supply valve. This embodiment may be used when small pressures are desired. The tank pressure may be decreased through the bleed valve 196 and then increased by applying heat through the heater 194. The heater 194 is coupled to a controller 193 for controlling the temperature of the heater 194.

Exemplary methods for using the automated specimen preparation system 100 to prepare a sample specimen from a patient sample contained in a sample container 112 will now be described. It is understood that the methods of the present invention do not require all of the steps of the method, but may include any combination of sub-processes of the overall method(s) disclosed herein. Moreover, the methods of the disclosed inventions do not require the steps be performed in any particular order, unless logic or the description explicitly requires the steps to be performed in a particular order. For example, describing that a step or steps occurs before or after another step or steps does not explicitly require such order, but only describes the order for clarity and convenience of the description.

Initially, a sample container 112 containing a patient sample is provided from which a sample specimen comprising an analytical element 150 having a specimen sample contained thereon is to be prepared. The sample container 112 is placed in a sample holder 116, the analytical element 150 is placed on an element loading platform 156, and a sample collector 154 is installed on the sample transfer device 140. Again, further details of the system 100 can be found in the above-incorporated U.S. patent application Ser. No. 15/454,819.

As shown in FIG. 3, the rotating tool head 132 is rotated and translated to position the sample collector 154 on the sample transfer device 140 in position to collect a specimen sample from the sample container 112 onto the membrane of the sample collector 154. A specimen sample is collected onto the membrane of the sample collector 154 by applying vacuum pressure (optionally cycled with positive pressure) from the pressure unit 130 through the sample transfer device 140. Prior to applying the pressure through the sample transfer device 140, the pressure in the pressure unit 130 is adjusted to be within a desired pressure range. For example, if vacuum pressure is desired, the vacuum tank 144 is brought to the desired vacuum pressure range by first performing a coarse pressure adjustment by operating the supply and/or bleed valves to bring the tank 144 to a pressure that is within a predetermined range of the desired pressure range.

In one embodiment, the coarse pressure adjustment brings the tank pressure to within 0.01 psi of the desired pressure range. Next, the temperature adjusting element 148 is operated to incrementally adjust the tank pressure until a pressure within the desired pressure range is achieved. In another example, if positive pressure is desired, the pressure tank 142 is pressurized to a pressure within the desired pressure range in a similar manner by first operating the supply and/or bleed valve and then operating the temperature adjusting element 146. After the pressure within the desired pressure range is achieved, the specimen transfer device 140 is operated to apply that pressure. In a same or different embodiment, the sample in the sample container 112 may be forced back and forth through the membrane on the sample collector 154 by cycling vacuum and pressure. This process allows a thin layer or single layer of particles, such as cells, to be collected on the membrane.

After the sample is collected onto the sample collector 154, as shown in FIG. 4, the tool head 132 is rotated and translated to position the sample collector 154 on the sample transfer device 140 in position to transfer the specimen sample to the analytical element 150. The sample transfer device 140 and/or the analytical element positioner 156 are then manipulated to contact the membrane having the specimen sample thereon onto the analytical element 150. In order to transfer the specimen sample (e.g., a thin layer of cells) to the analytical element 150, positive pressure may be applied through the specimen transfer device 140. The pressure in the pressure unit 130 may be adjusted until the desired positive pressure is achieved. Similar to the procedure described above, pressure in the pressure tank 142 is initially adjusted using the supply and/or bleed valve to achieve a tank pressure that is close to the desired pressure range. For example, the supply and/or bleed valve is operated until the tank pressure is within 0.001 psi of the desired pressure range. Next, the temperature adjusting element 146 is operated to incrementally adjust the pressure until a pressure with the desired pressure range is achieved. This pressure is then applied through the specimen transfer device 140 to transfer the specimen from the membrane to the analytical element 150.

Although particular embodiments of the disclosed inventions have been shown and described herein, such disclosure is provided for purposes of explanation and illustration only, and it is to be understood that the above description is not intended to limit the scope of the disclosed inventions. For example, not all of the components described in the embodiments are necessarily required, and the disclosed inventions may be embodied in and/or practiced with any suitable combinations of the described components. Also, the general shapes and relative sizes of the components of the disclosed embodiments may be modified without departing from the inventive concepts. Furthermore, while the foregoing disclosed and described systems and methods are for making cytological specimens from patient samples, the disclosed inventive concepts of fine pressure tank regulation as part of a manufacturing or other process may also be applicable in other fields. Accordingly, the disclosed and described embodiments are provided for purposes of illustration and not limitation and the disclosed inventions, therefore, should not be limited, except to the following claims and their equivalents.

What is claimed is:

1. A system for preparing a cytological specimen from a patient sample held in a sample container, the system comprising:
    a specimen transfer device including an elongate sample collector extending therefrom, wherein the transfer device is configured to position a distal end portion of the sample collector within the sample container;
    a pressure tank having an output fluidly coupled to the specimen transfer device and configured for communicating at least one of positive pressure and vacuum pressure through the specimen transfer device; and
    a pressure unit including a temperature adjusting unit and a pressure sensor, the pressure sensor configured to measure a pressure within the pressure tank, the temperature adjusting unit thermally coupled to the pressure tank, wherein the temperature adjusting unit is configured for incrementally adjusting a pressure in the pressure tank to within a desired pressure range as measured by the pressure sensor by heating or cooling a wall of the pressure tank.

2. The system of claim 1, wherein the pressure tank is a vacuum tank.

3. The system of claim 1, wherein the pressure tank is a positive pressure tank.

4. The system of claim 1, wherein the temperature adjusting unit is a heater.

5. The system of claim 1, wherein the temperature adjusting unit is a Peltier device.

6. The system of claim 1, further comprising a bleed valve fluidly coupled to an output of the pressure tank.

7. The system of claim 6, further comprising a pump and a supply valve fluidly coupled to the pressure tank.

8. The system of claim 1, further comprising a controller operatively coupled to the temperature adjusting unit.

9. The system of claim 1, the pressure tank comprising a first pressure tank having an output fluidly coupled to the specimen transfer device and configured for communicating positive pressure through the specimen transfer device, the system further comprising a second pressure tank having an output fluidly coupled to the specimen transfer device and configured for communicating vacuum pressure through the specimen transfer device.

10. The system of claim 9, wherein the temperature adjusting unit comprises a first temperature adjusting unit thermally coupled to the first pressure tank, wherein the first temperature adjusting unit is configured for incrementally adjusting a pressure in the first pressure tank by heating or cooling a wall of the first pressure tank, the system further comprising a second temperature adjusting unit thermally coupled to the second pressure tank, wherein the second temperature adjusting unit is configured for incrementally adjusting a pressure in the second pressure tank by heating or cooling a wall of the second pressure tank.

11. The system of claim 9, wherein the temperature adjusting unit is thermally coupled to each of the first and second pressure tanks.

12. The system of claim 1, further comprising at least one of a supply valve and a bleed valve fluidly coupled to the pressure tank, and configured to perform a coarse pressure adjustment of the pressure within the pressure tank, and wherein the pressure unit is configured to perform a fine pressure adjustment after performing a course pressure adjustment.

13. The system of claim 12, wherein the course pressure adjustment is configured to adjust the pressure within pressure tank to within 0.05 psi or less of the desired range, and the fine pressure adjustment is configured to adjust the pressure within the pressure tank to within a range having a breadth of +/−0.01 psi or less.

14. The system of claim 1, further comprising an electronic control unit connected to the pressure sensor to receive a pressure-responsive signal corresponding to a pressure within the pressure tank, and operably coupled to the pressure unit to adjust the pressure within the pressure tank as measured by the pressure sensor by heating or cooling the wall of the pressure tank using the temperature adjusting unit.

15. The system of claim 14, further comprising at least one of a supply valve and a bleed valve fluidly coupled to the pressure tank, and configured to perform a coarse pressure adjustment of the pressure within the pressure tank, and wherein the pressure unit is configured to perform a fine pressure adjustment after performing a course pressure adjustment.

* * * * *